United States Patent [19] — Seimiya et al.

[11] 4,414,190
[45] Nov. 8, 1983

[54] METHOD OF PREPARING SILICON NITRIDE

[75] Inventors: Motoo Seimiya, Yokosukashi; Katsutoshi Nishida, Yokohamashi, both of Japan

[73] Assignee: Tokyo Shibaura Denki Kabushiki Kaisha, Kawasaki, Japan

[21] Appl. No.: 358,433

[22] Filed: Mar. 15, 1982

Related U.S. Application Data

[63] Continuation of Ser. No. 188,101, Sep. 17, 1980.

[30] Foreign Application Priority Data

Nov. 22, 1979 [JP] Japan ............... 54-150739

[51] Int. Cl.³ .................................. C01B 21/06
[52] U.S. Cl. .......................... 423/344; 423/335
[58] Field of Search ..................... 423/335, 344

[56] References Cited

U.S. PATENT DOCUMENTS

| | | | |
|---|---|---|---|
| 2,719,779 | 10/1955 | Bray et al. | 423/458 |
| 3,928,540 | 12/1975 | Morgan | 423/335 |
| 4,117,095 | 9/1978 | Komeya et al. | 423/344 |
| 4,122,152 | 10/1978 | Mori | 423/344 |
| 4,377,563 | 3/1983 | Seimiya | 423/345 |

OTHER PUBLICATIONS

Komeya, K. and H. Inoue, "Synthesis of the α Form of Silicon Nitride From Silica" Journal of Materials Science 10 (1975) pp. 1243–1246.

*Primary Examiner*—Earl C. Thomas
*Assistant Examiner*—Jackson Leeds
*Attorney, Agent, or Firm*—Oblon, Fisher, Spivak, McClelland & Maier

[57] ABSTRACT

A method of producing silicon nitride which comprises heating wet process white carbon in the presence of a carbon source and a source of nitrogen.

11 Claims, No Drawings

METHOD OF PREPARING SILICON NITRIDE

This application is a continuation of application Ser. No. 188,101, filed Sept. 17, 1980.

BACKGROUND OF THE INVENTION

1. Field of the Invention

The present invention relates to a method of preparing silicon nitride from silica.

2. Description of the Prior Art

Sintered silicon nitride has been used to manufacture articles which are subjected to high temperatures and high stresses. The thermal and mechanical properties of the sintered silicon nitride are greatly affected by the nature of the starting materials used to prepare it. It is preferable that the silicon nitride contain as much $\alpha$-$Si_3N_4$ powder as possible.

Silicon nitride powder has been prepared by the following methods:

1. The reaction of nitrogen and silicon;
2. The vapor phase reaction of silicon tetrachloride or silane with ammonia; and
3. The nitridization of purified silica with carbon powder.

Each of these methods has deficiencies. Method (1) requires silicon metal which is expensive and consequently, the silicon nitride produced is also expensive. Method (2) cannot be used for the mass production of inorganic refractory raw material, while Method (3) requires a long reaction time at elevated temperatures. Moreover, the yield of $\alpha$-$Si_3N_4$ is low.

A need continues to exist for a process of preparing silicon nitride, especially for a process which produces a high yield of $\alpha$-$Si_3N_4$.

SUMMARY OF THE INVENTION

Accordingly, it is an object of the present invention to provide a low-cost method for preparing silicon nitride.

It is another object of the present invention to provide a method of mass producing silicon nitride.

It is another object of the present invention to provide a method of preparing silicon nitride in a short period of time.

Yet another object of the present invention is to provide a method of preparing silicon nitride having a high content of $\alpha$-$Si_3N_4$.

These and other objects have now been attained in the present invention by heating white carbon, obtained by wet process (wet process white carbon), and a source of carbon and nitrogen.

DETAILED DESCRIPTION OF THE PREFERRED EMBODIMENTS

White carbon is a type of silica and was first commercialized by PPG as Hi-Sol ®. It has been used to reinforce rubber. However, it has not been considered as a suitable raw material for the production of silicon nitride because it is a highly purified form of silica. However, heating wet process white carbon in the presence of a source of carbon and nitrogen it is easy to produce silicon nitride having a high content of $\alpha$-$Si_3N_4$ in a short period of time. The wet process and the dry process as well known processes for the preparation of white carbon. However, in the present invention, wet process white carbon is preferred because heating white carbon prepared by the dry process (dry process white carbon) in the presence of a source of carbon and nitrogen, it takes a long period of time to produce silicon nitride.

Any wet process white carbon may be used in the present invention. Typical wet processes used to produce wet process white carbon are as follows:

1. Dissociating alkali metal silicate with an acid. For example, $Na_2O(SiO_2)_n + H_2SO_4 \rightarrow nSiO_2 + H_2O + Na_2SO_4$.
2. Dissociating alkali metal silicate with an ammonium salt. For example, $Na_2O(SiO_2)_n + 2NH_4Cl \rightarrow nSiO_2 2NaCl + H_2O + 2NH_3$.
3. Dissociating alkali earth metal silicate with acid. The alkali earth metal silicate is prepared by a reaction between alkali metal silicate and alkali earth metal salt. For example, $Na_2O(SiO_2)_n + CaCl_2 \rightarrow CaO(SiO_2)_n + 2NaCl$ or $CaO(SiO_2)_n + 2HCl \rightarrow nSiO_2 + CaCl_2 + H_2O$.
4. Adding sodium silicate and carbonic acid gas to mother liquid for sodium hydrogen carbonate in the ammonia soda process.
5. Dissociating sodium silicate by ion-exchange separation.

The preferred source of wet process white carbon is that prepared by the process of dissociating alkali metal silicate with an acid because of its high reactivity.

In order to minimize the reaction time, it is advantageous to use finely divided wet process white carbon. The use of finely divided wet process white carbon is not, however, critical if longer reaction times are acceptable. Preferably, the mean particle size of the wet process white carbon is between about 0.015 and 0.035 microns. Preferably, the surface area of the white carbon is between about 50 and 350 $m^2/g$.

Any source of carbon may be used. Suitable sources of carbon include solid carbon such as carbon black, coke powder and charcoal, or carbon containing materials which are gaseous under the reaction conditions, such as hydrocarbons, especially the lower paraffinic hydrocarbons having from 1 to about 7 carbon atoms.

Any source of nitrogen may be used including nitrogen or ammonia.

A reducing gas such as hydrogen may be used to conduct the reaction in a reducing atmosphere if that is desired.

The reaction temperature is typically from about 1200° to about 1600° C.; more preferable, 1350° to 1500° C. When the reaction temperature is too low, the nitridization reaction will progress too slowly to be of practical value. Where the reaction temperature is too high, vaporization of the white carbon and generation of silicon carbide may occur. Preferably, the reaction time is 1 hour at 1600° C. and 8 hours at 1300° C. However, longer or shorter reaction times may be used.

Silicon nitride powder, obtained by the reaction, may be heated in an oxidizing atmosphere, for instance air, to remove carbon adhered on the surface of the silicon nitride powder. Temperatures of from about 600° to 1000° C. are suitable.

Having generally described this invention, a further understanding can be obtained by reference to certain specific examples which are provided herein for purposes of illustration only and are not intended to be limiting unless otherwise specified.

EXAMPLES

The results of Examples 1-4 are tabulated in the table following Example 4.

EXAMPLE 1

1. Wet process white carbon raw material; Vitasil #550 (manufactured by Taki Chemical Company of Japan, mean particle size of 0.025 micron and a surface area of 250 to 300 m$^2$/g).
2. Volume of wet process white carbon charged; 4.32 g.
3. Volume of carbon powder; 1.68 g (mean particle size of 3 microns).
4. Boat volume to be filled with white carbon and carbon powder; 20 cc.
5. Boat material; carbon.
6. Gas atmosphere; NH$_2$—60 l/hr; H$_3$—600 l/hr.
7. Heating temperature; 1400° C.
8. Heating time; 3 hours.
9. Additional heating condition to remove adhered carbon; 800° C. for 2 hours in air.

EXAMPLE 2

1. Wet process white carbon raw material; Vitasil #1500 (manufactured by Taki Chemical Company of Japan, mean particle size of 0.018 micron and a surface area of 180 to 230 m$^2$/g).
2. Heating temperature; 1450° C.
3. Heating time; 1.5 hours.
4. Other conditions identical to those of Example 1.

EXAMPLE 3

1. Wet process white carbon raw material; Ammonia granulated Vitasil #550.
2. Gas atmosphere; CH$_4$—30 l/hr; NH$_3$—60 l/hr; H$_2$—600 l/hr.
3. Volume of wet process white carbon charged; 6 g.
4. Boat volume to be filled with white carbon; 20 cc.
5. Boat material; carbon.
6. Heating temperature; 1400° C.
7. Heating time; 3 hours.
8. Additional heating condition to remove adhered carbon; 800° C. for 2 hours in air.

EXAMPLE 4

1. Wet process white carbon raw material; Vitasil #1500.
2. Volume of wet process white carbon charged; 5 g.
3. Volume of carbon black; 2.5 g.
4. Boat volume to be filled with white carbon and carbon black; 20 cc.
5. Boat material; graphite.
6. Gas atmosphere; N$_2$—200 l/hr.
7. Heating temperature; 1450° C.
8. Heating time; 5 hours.
9. Additional heating condition to remove adhered carbon; 800° C. for 2 hours in air.

TABLE 1

| Example | Phases Detected by X-Ray Diffraction Analysis | | | | | Chemical Analysis | |
|---|---|---|---|---|---|---|---|
| | α-Si$_3$N$_4$ | β-Si$_3$N$_4$ | SiC | Si$_2$ON$_2$ | SiO$_2$ | O | C |
| 1 | 96 wt. % | 4 wt. % | ND* | ND | Tr** | 3.2 wt. % | 0.8 wt. % |
| 2 | 95 | 5 | ND | ND | Tr | 2.2 | 1.5 |
| 3 | 96 | 4 | ND | ND | Tr | 2.8 | 1.0 |
| 4 | 95 | 5 | ND | ND | Tr | 1.8 | 0.8 |

*ND: Not detectable
**Tr: Trace

Having now fully described the present invention, it will be apparent to one of ordinary skill in the art that many changes and modifications can be made thereto without departing from the spirit or scope of the invention as set forth herein.

What is claimed as new and intended to be covered by Letters Patent is:

1. In a method of producing silicon nitride of high α-Si$_3$N$_4$ content, which method consists essentially of heating silica in the presence of a carbon source and a nitrogen source, the improvement consisting in utilizing as said silica a wet process white carbon having a mean particle size between 0.015 and 0.035 micron, and having a surface area between 50 and 350 m$^2$/g, said wet process white carbon having been produced by the process consisting essentially of dissociating an alkali metal silicate with an acid.

2. The method of claim 1, wherein the wet process white carbon is heated to a temperature of 1200° C. to 1600° C.

3. The method of claim 1, wherein the wet process white carbon is heated to a temperature of 1350° C. to 1500° C.

4. The method of claim 1, wherein the silicon nitride powder produced is heated in an oxidizing atmosphere to remove carbon adhered to the surface of said silicon nitride powder.

5. The method of claim 1, wherein said carbon source is introduced as a gas.

6. The method of claim 5, wherein said carbon source is a hydrocarbon.

7. The method of claim 1, wherein said carbon source is a solid carbon.

8. The method of claim 1, wherein said nitrogen source is N$_2$.

9. The method of claim 1, wherein said nitrogen source is ammonia.

10. The method of claim 1, wherein a reducing gas is present.

11. The method of claim 10, wherein said reducing gas is hydrogen.

* * * * *